UNITED STATES PATENT OFFICE.

TALBOT J. ALBERT, JR., OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING TETRA-SUBSTITUTED UREAS.

1,393,597. Specification of Letters Patent. Patented Oct. 11, 1921.

No Drawing. Application filed September 25, 1918. Serial No. 255,582.

*To all whom it may concern:*

Be it known that I, TALBOT J. ALBERT, Jr., of Wilmington, in the county of New Castle and in the State of Delaware, have invented a certain new and useful Improvement in Processes of Producing Tetra-Substituted Ureas, and do hereby declare that the following is a full, clear, and exact description thereof.

This invention relates to the process of producing tetra-substituted ureas by the action of carbonyl chlorid on a secondary amin, and particularly to a process of this type in which a reagent is used which is capable of neutralizing the hydrogen chlorid formed during the reaction. More specifically the invention pertains to a process of producing dialkyldiarylurea by treating an alkylarylamin, such as methylanilin, with carbonyl chlorid in the presence of an aqueous solution of a basic compound which does not react readily with carbonyl chlorid.

When a secondary amin, such as methylanilin is treated alone with carbonyl chlorid, only half of the amin is converted into urea, the other half reacting with hydrogen chlorid to form the hydrochlorid of the secondary amin. The principal object of my invention is to avoid this reaction between the secondary amin and hydrogen chlorid.

I have discovered that secondary amins, such as alkylarylamins, may be advantageously converted into tetra-substituted ureas by treating with carbonyl chlorid the practically pure secondary amin suspended in an aqueous solution of a basic inorganic compound such as an alkali metal carbonate. The reaction between carbonyl chlorid and the water or the alkali metal carbonate is practically negligible, especially if the temperature be maintained within certain limits. The HCl formed by the reaction of the secondary amin, for example monomethylanilin, and carbonyl chlorid to form dimethyldiphenylurea, reacts with the soda, and thus permits practically a complete conversion of the monomethylanilin to dimethyldiphenylurea. In order to promote a rapid reaction between the monomethylanilin and the carbonyl chlorid, the mixture should be continuously stirred in order to keep the suspended droplets of monomethylanilin well distributed throughout the mixture. A rapid reaction between the monomethylanilin and the carbonyl chlorid is also promoted by heating the mixture, as for example at a temperature between 90 and 100° C.

Instead of sodium carbonate, any material may be used which, at the temperature used, is soluble in water, and reacts readily with the HCl formed by the reaction between the carbonyl chlorid and the monomethylanilin. Best results are obtained if the compound used is one which does not react readily with carbonyl chlorid.

While the proportions of monomethylanilin, water, and soda or other basic substances may be varied within wide limits, the following example describes one set of conditions under which the process may be carried out: 100 parts of monomethylanilin, 124 parts of water and 62 parts of sodium carbonate are mixed in a suitable vessel provided with a stirring device and with proper provisions for heating and cooling the mixture. The stirrer is started and carbonyl chlorid passed into the mixture until a total has been passed in which amounts to a 5% excess over the amount required theoretically for the complete conversion of the monomethylanilin to dimethyldiphenylurea. The reaction mixture is then heated for two hours at 95–99° C. in order to effect the completion of the reaction. The crude product is then filtered off and washed with water until it is free from acid or alkali. In order to complete the purification the product may be crystallized from a suitable solvent.

I claim:

1. The process of producing tetra-substituted ureas which comprises treating a secondary amin with carbonyl chlorid in the presence of an aqueous solution of a basic inorganic compound capable of neutralizing hydrochloric acid which results from the reaction between the carbonyl chlorid and the secondary amin.

2. The process of producing tetra-substituted ureas which comprises treating an alkylarylamin with carbonyl chlorid in the presence of an aqueous solution of a basic inorganic compound capable of neutralizing hydrochloric acid which results from the reaction between the carbonyl chlorid and the secondary amin.

3. The process of producing tetra-substituted ureas which comprises treating methylanilin with carbonyl chlorid in the presence of an aqueous solution of a basic inorganic compound capable of neutralizing hydrochloric acid which results from the reaction between the carbonyl chlorid and the secondary amin.

4. The process of producing tetra-substituted ureas which comprises treating a secondary amin with carbonyl chlorid in the presence of an aqueous solution of an alkali metal carbonate.

5. The process of producing tetra-substituted ureas which comprises treating methylanilin with carbonyl chlorid in the presence of an aqueous solution of an alkali metal carbonate.

6. The process of producing tetra-substituted ureas which comprises treating a secondary amin with carbonyl chlorid in the presence of an aqueous solution of a water-soluble basic compound which does not react readily with carbonyl chlorid.

7. The process of producing a tetra-substituted urea which comprises passing carbonyl chlorid in an amount a little in excess of that theoretically required into a mixture of an alkylarylamin and an aqueous solution of a basic inorganic compound, and heating the resulting mixture until the reaction is completed.

8. The process of producing dimethyldiphenylurea which comprises passing carbonyl chlorid in an amount a little in excess of that theoretically required into a mixture of methylanilin and an aqueous solution of a basic inorganic compound, and heating the resulting mixture until the reaction is completed.

9. The process of producing dimethyldiphenylurea which comprises passing carbonyl chlorid in an amount a little in excess of that theoretically required into a mixture of methylanilin and an aqueous solution of sodium carbonate, and heating the resulting mixture until the reaction is completed.

10. The process of producing dimethyldiphenylurea which comprises passing carbonyl chlorid in an amount a little in excess of that theoretically required into a mixture of methylanilin and an aqueous solution of a basic inorganic compound, and heating the resulting mixture at a temperature between 90 and 100° C. until the reaction is completed.

11. The process of producing dimethyldiphenylurea which comprises passing carbonyl chlorid into 100 parts of methylanilin mixed with a solution of about 62 parts of sodium carbonate in about 124 parts of water, the mixture being continually stirred, until the amount of carbonyl chlorid passed in is a little in excess of that theoretically required, then heating the mixture for about 2 hours at 95–99° C., and then filtering off and washing the crude dimethyldiphenylurea.

In testimony that I claim the foregoing I have hereunto set my hand.

TALBOT J. ALBERT, Jr.

Witnesses:
P. E. STRICKLAND,
ARTHUR P. TAUBERG.